US012687854B2

(12) United States Patent
Liang et al.

(10) Patent No.: US 12,687,854 B2
(45) Date of Patent: Jul. 21, 2026

(54) HIGH-EFFICIENT AUTONOMOUS EXPLORATION METHOD, SYSTEM, AND TERMINAL FOR UAVS

(71) Applicant: Wuhan University, Wuhan (CN)

(72) Inventors: Xinlian Liang, Wuhan (CN); Haiyun Yao, Wuhan (CN)

(73) Assignee: Wuhan University, Wuhan (CN)

( * ) Notice: Subject to any disclaimer, the term of this patent is extended or adjusted under 35 U.S.C. 154(b) by 180 days.

(21) Appl. No.: 18/767,903

(22) Filed: Jul. 9, 2024

(65) Prior Publication Data

US 2026/0056547 A1 Feb. 26, 2026

(30) Foreign Application Priority Data

Oct. 17, 2023 (CN) .......................... 202311346667.2

(51) Int. Cl.
| | |
|---|---|
| *G05D 1/229* | (2024.01) |
| *G05D 1/622* | (2024.01) |
| *G05D 1/644* | (2024.01) |
| *G05D 101/00* | (2024.01) |
| *G05D 105/80* | (2024.01) |
| *G05D 109/20* | (2024.01) |

(52) U.S. Cl.
CPC ............. *G05D 1/229* (2024.01); *G05D 1/622* (2024.01); *G05D 1/6445* (2024.01); *G05D 2101/00* (2024.01); *G05D 2105/87* (2024.01); *G05D 2109/20* (2024.01)

(58) Field of Classification Search
None
See application file for complete search history.

(56) References Cited

U.S. PATENT DOCUMENTS

| | | | |
|---|---|---|---|
| 9,070,285 B1 * | 6/2015 | Ramu .................. | G05D 1/0044 |
| 11,794,784 B1 * | 10/2023 | Taylor ................. | B60W 40/072 |
| 2024/0378750 A1 * | 11/2024 | Lane ......................... | G06T 7/74 |

FOREIGN PATENT DOCUMENTS

| | | |
|---|---|---|
| CN | 114594788 A | 6/2022 |
| CN | 116382331 A | 7/2023 |
| CN | 116481532 A | 7/2023 |

* cited by examiner

*Primary Examiner* — James J Lee
*Assistant Examiner* — Elizabeth Galyn Martinez
(74) *Attorney, Agent, or Firm* — Nitin Kaushik

(57) ABSTRACT

The present disclosure belongs to a field of UAVs exploration technology, discloses a high-efficient autonomous exploration method, system, and terminal for UAVs, comprising: S1, heuristic waypoint generation: setting an exploration scope and waypoint spacing, and generating waypoints through waypoint generation algorithms; S2, global path planning: after generating heuristic waypoints, an A * algorithm is used to generate the global planning path; S3, real-time positioning and mapping: using point clouds for real-time positioning and mapping; S4, local B-spline trajectory generation: using B-spline parameterization method to generate local trajectories; S5, real-time obstacle avoidance and dynamic feasibility constraints: optimizing the trajectories to achieve fast convergence, generating smooth, collision-free, and dynamically feasible trajectories; S6, local real-time replanning: using a time sliding window for local replanning; S7, flight control: Using UAV control algorithms for controlling of UAVs robustly.

12 Claims, 14 Drawing Sheets module (a)          (b)          (c)          (d)

1

HIGH-EFFICIENT AUTONOMOUS EXPLORATION METHOD, SYSTEM, AND TERMINAL FOR UAVS

CROSS-REFERENCE TO RELATED APPLICATIONS

The application claims priority to Chinese patent application No. 202311346667.2, filed on Oct. 17, 2023, the entire contents of which are incorporated herein by reference.

TECHNICAL FIELD

The present disclosure relates to but is not limited to a field of UAVs (unmanned aerial vehicles) exploration technology, in particular to a high-efficient autonomous exploration method, system, and terminal for UAVs.

BACKGROUND

In prior art, the autonomous exploration methods for UAVs were mainly developed for small-scale indoor and underground scenes, mainly based on boundary areas and the best sampling perspective. Among them, the boundary-based method effectively explores the entire region of interest by finding and accessing the boundaries between explored and unexplored regions, until the entire boundary is explored. Based on the best perspective method, the concept of "Next Best Perspective" (NBV) is used for autonomous exploration, which can provide more environmental information. NBV defines a concept of information gain, which refers to how much information can be extracted from the environment at a specific perspective, and explores by maximizing the information gain. The effectiveness of this method largely depends on the selection of sampling techniques.

The current autonomous exploration algorithms are provided with relatively efficient exploration efficiency in small-scale indoor and other spaces, but most current methods adopt overly greedy exploration strategies for autonomous exploration, often falling into local optima. Moreover, methods based on sampling the best perspective do not consider the dynamic feasibility of UAVs, and the resulting trajectories are not smooth, the flight speed is slow, and frequent stops and starts occur. In addition, the exploration method based on boundary regions involves a lot of back-and-forth maneuvers in large-scale scenes such as forests, resulting in a large number of ineffective and repetitive explorations, thereby reducing exploration efficiency. Due to the limited endurance of small UAVs, frequent and ineffective repeated explorations can lead to fatal flaws in achieving high-efficient autonomous exploration in large-scale unknown environments. At present, in large-scale environments such as forests, mainstream exploration methods have a fatal limitation, that is they cannot carry out complete global exploration and thus cannot obtain complete forest data. In addition, the greedy strategies lean too much towards local exploration make it difficult to quickly and comprehensively explore the entire space in a limited time, which limits exploration efficiency and also leads to unsatisfactory quality of map building.

SUMMARY

Aiming at problems in prior art, the present disclosure provides a high-efficient autonomous exploration method, system, and terminal for UAVs.

The present disclosure is implemented as follows: a novel autonomous exploration method for UAVs, proposing a heuristic waypoint generation method to promote using of aircraft for effective and full coverage autonomous exploration in complex and unknown forest environments. Based on the waypoints, a complete global path can be created, comprising both lateral and vertical waypoints, to ensure effective coverage of an entire exploration area. Subsequently, nonlinear optimization was employed to generate smooth, collision-free, and dynamically feasible local planning trajectories by using B-spline curves. Finally, when obstacles such as tree trunks and branches are detected, a sliding window strategy is used to adjust trajectories quickly, which ensures the aircraft replans path in a timely manner without collision.

Another purpose of the present disclosure is to provide a high-efficient autonomous exploration method for UAVs, comprising following steps:

S1, heuristic waypoints generating: setting an exploration scope and a waypoint spacing, and generating waypoints by waypoint generation algorithms; and S2, global path planning: after generating heuristic waypoints, an A * algorithm is used to generate a global planning path; and S3, real-time positioning, and mapping: using point clouds for real-time positioning and mapping; and S4, local B-spline trajectories generating: using B-spline parameterization methods to generate local trajectories; and S5, real-time obstacle avoidance and dynamic feasibility constrainting: optimizing the trajectories to achieve fast convergence, generating smooth, collision-free, and dynamically feasible trajectories; and S6, local real-time replanning: using time sliding windows for local replanning; and S7, flight controlling: using UAV control algorithms for controlling UAVs robustly.

Further, the step S1 specifically comprising:

(1) Exploration Scope Setting:

setting an exploration scope of a sample site according to actual requirements, including defining a length, a width and a height dimensions (minX, maxX, minY, maxY, minZ, maxZ); and (2) Waypoint Spacing Setting:

generating 3D waypoints by traversing the entire exploration space, and setting step sizes in three directions respectively: length, width, and height; the step sizes in these three directions are determined according to actual situation;

(3) Waypoint Generation Algorithms:

traversing and exploring entire unknown space by using different waypoint generation strategies in an exploration space: firstly, using an idea of lateral layering, first generating waypoints in a plane with a certain step size and completely traversing the entire space, and then generating waypoints in next plane based on a step size of altitude direction until the entire space is completely traversed; secondly, adopting an idea of vertical undulation, the generated waypoints are undulated intermittently, wherein a maximum and a minimum scope of interval undulations can be set to be consistent until the entire space is completely traversed; thirdly, in order to obtain more complete data for a single tree, a series of waypoints are generated through an idea of spiral ascent.

Further, the step S2 specifically comprising:

(1) initializing:

1) determining starting and target points as starting and ending nodes for the A * algorithm; and 2) creating an open list to store nodes to be expanded, and a closed list to store nodes have already been expanded; and 3) adding the starting node to the open list, setting an initial cost to 0, and calculating a heuristic estimate value; and (2) iterative looping: entering a loop until the open list is empty or a target node is found; and (3) iterative looping: selecting a node from the open list, the node should be provided with a lowest total cost (a cost+the heuristic estimate value), and the node will become a current expansion node; and (4) node expanding: expanding the current expansion node by finding adjacent feasible nodes (waypoints), calculating the cost and the heuristic estimate value, and adding to the open list; and (5) checking adjacent nodes: performing following checks for each adjacent node:

1) if the node is already in the closed list, skipping and no longer considering; and 2) if the node is not in the open list, adding to the open list and setting a parent node as a current extension node; and 3) if the node is already in the open list, comparing a current path cost with an existing path cost, selecting a smaller cost path, updating the parent node to the current expansion node; and (6) termination condition checking: if the target node appears in the open list (indicating a path to target has been found), or if the open list is empty (indicating the path cannot be found), terminating looping; and (7) refactoring path: if the path is found, starting from the target node and tracing back to the starting node through a parent node pointer to obtain a final path; and (8) returning result: returning the generated global path or indicating results of the path cannot be found.

Further, the step S3 specifically comprising:

(1) data acquiring: collecting environmental data through LiDAR sensors to obtain laser point cloud data; the point cloud data contains location information of objects in the environment; and (2) feature extracting: extracting features from the laser point cloud data, such as ground features, tree trunk features, etc; these features will be used for subsequent location and mapping processes; and (3) motion estimating: estimating robots' motion (pose transformation) by comparing feature point changes between consecutive frames; and (4) data associating: associating features of current frame with previously established map features to identify the feature points in the known map matching with the current frame; and (5) map updating: based on results of data association, updating the map and adding new feature points to the map; and (6) location updating: based on results of motion estimation and data association, updating position estimation of the robots, the robots here specifically refer to the UAVS; and (7) looping detecting: detecting whether a loop has occurred, that is, whether the robots have returned to previously explored position during exploration process; looping detection can avoid accumulated errors; and (8) optimizing: optimizing the trajectories of the map and robots to reduce cumulative errors by using optimization methods such as graph optimization.

Further, the step S4 specifically comprising:

using the B-spline parameterization method to generate the local trajectories, a B-spline of degree p is a piecewise polynomial function defined by a series of discrete control points $\{P_0, P_1, \ldots, P_N\}$ and node vectors $[t_0, t_1 \ldots t_m]$, wherein $t_{m+1}-t_m$ is the same time interval $\Delta t_m$, and wherein $P_i \in \mathbb{R}^3$, $t_m \in \mathbb{R}$, and m=N+p+1, values of the B-spline can be represented by a matrix:

$$B(s) = \left[1, s, s^2, \ldots, s^p\right] \cdot M_{p+1} \cdot [P_{m-p}, P_{m-p+1}, P_{m-p+2}, \ldots, P_m]^T;$$

Here, $M_{p+1}$ is a constant matrix depends only on the parameter p, the p is 3, while $s=(t-t_m)/(t_{m+1}-t_m)$, wherein t belongs to an interval $[t_m, t_{m+1})$.

Further, the step S5 specifically comprising: the uniform B-spline has the same time interval $\Delta t$, and calculation formulas for velocity $V_i$ of control points $P_i$, acceleration $A_i$, and jerk $J_i$ are as follows:

$$V_i = \frac{P_{i+1} - P_i}{\Delta t}, A_i = \frac{V_{i+1} - V_i}{\Delta t}, J_i = \frac{A_{i+1} - A_i}{\Delta t};$$

based on convex hull characteristic of B-splines, optimizing the trajectories to achieve fast convergence, generating smooth, collision-free, and dynamically feasible trajectories.

Further, the step S6 specifically comprising:

using the time sliding windows for local replanning, a trajectory replanning mechanism will be triggered when the sliding window detects the local trajectory passing through obstacles; then a new local trajectory is generated to avoid obstacles and ensure safety of the UAVs, and a new local trajectory is re-integrated into the global trajectories.

Another purpose of the present disclosure is to provide a high-efficient autonomous exploration system for UAVS, comprising:

heuristic waypoint generation module: setting the exploration scope and the waypoint spacing, and generating waypoints through waypoint generation algorithms; and global path planning module: after generating heuristic waypoints, the A * algorithm is used to generate the global planning path; and real-time positioning and mapping module: using point clouds for real-time positioning and mapping; and local B-spline trajectory generation module: using the B-spline parameterization method to generate local trajectories; and real-time obstacle avoidance and dynamic feasibility constraint module: optimizing trajectories to achieve fast convergence, generate smooth, collision-free, and dynamically feasible trajectories; and local real-time replanning module: using the time sliding windows for local replanning; and flight controlling module: using UAV control algorithms for controlling UAVs robustly.

Another purpose of the present disclosure is to provide an information data processing terminal, the information data processing terminal is used for implementing a high-efficient autonomous exploration system for UAVs.

BRIEF DESCRIPTION OF DRAWINGS

In order to provide a clearer explanation of the technical solution of the disclosed embodiment, a brief introduction will be made to the accompanying drawings required in the disclosed embodiment. It is obvious that the accompanying drawings described below are only some of the disclosed embodiment. For those skilled in the art, other accompanying drawings can be obtained based on these drawings without creative labor.

DETAILED DESCRIPTION OF THE EMBODIMENTS

Figure 1:
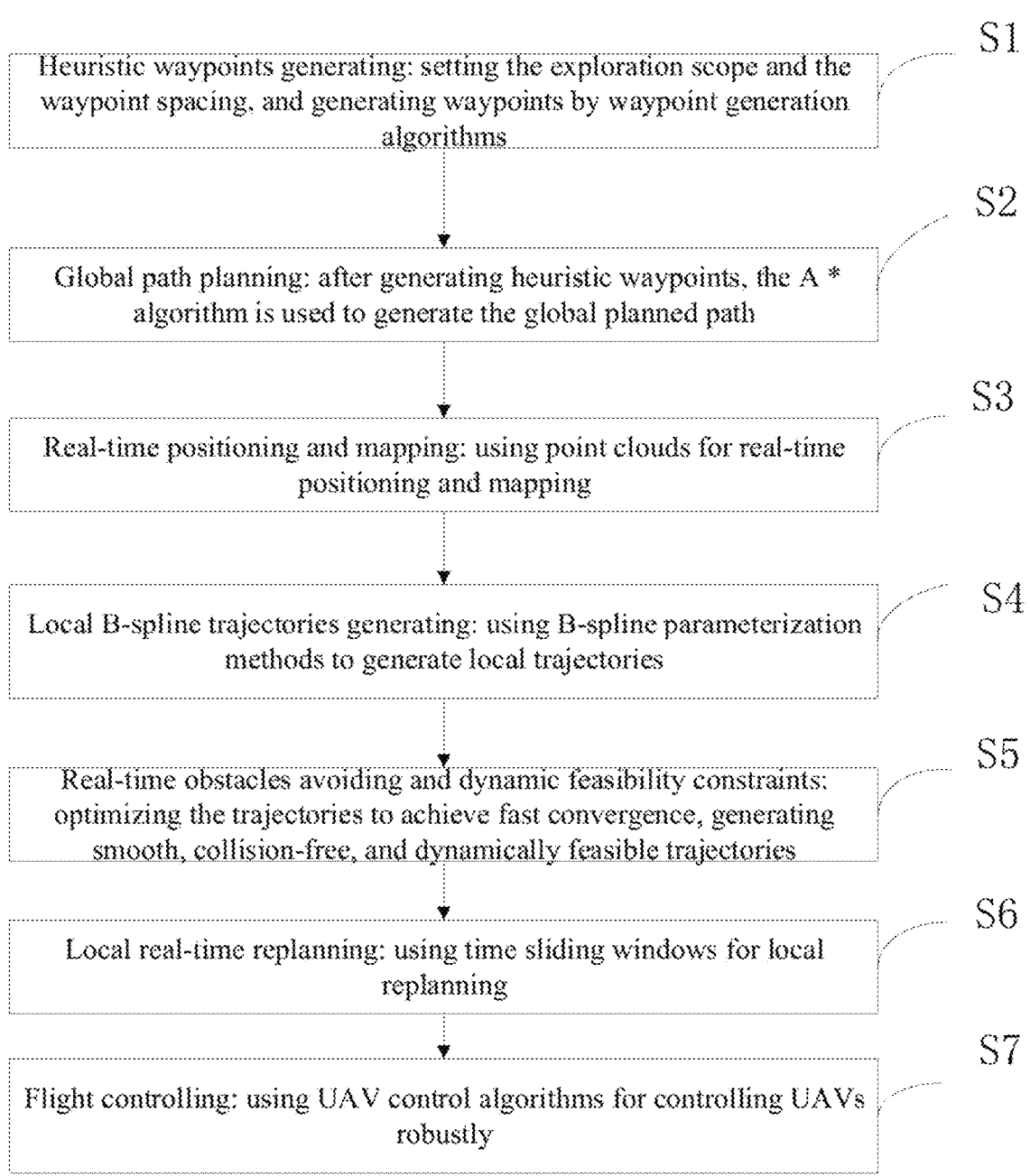
FIG. 1 is a flowchart of the high-efficient autonomous exploration method for UAVs provided in the present disclosed embodiment.

In order to make the purpose, technical solution, and advantages of this disclosure clearer, the following will provide further detailed explanations of this disclosure in conjunction with embodiment. It should be understood that the specific embodiment described here is only intended to explain this disclosure and is not intended to limit it.

Aiming at problems in prior art, this disclosure provides a high-efficient autonomous exploration method, system, and terminal for UAVs. The following is a detailed description of this disclosure in conjunction with the accompanying drawings.

The technical solution proposed in this disclosure, namely the heuristic waypoint autonomous exploration plan, aims to solve the data collection problems in large-scale complex environments such as forests in prior art. This solution utilizes a heuristic waypoint generation algorithm that does not rely on prior environmental information to support UAVs in global path planning, enabling rapid and comprehensive exploration of complex environments such as forests. This algorithm specifically considers elevation information to optimize exploration paths and improve the integrity of data collection. By using B-spline curves to generate smooth and collision-free local planning trajectories, and quickly adjusting them through sliding window strategies when encountering obstacles. This solution ensures safety and efficiency for the UAVs during exploration.

In practical applications, this technical solution can complete coverage of the entire exploration area in a short time, achieving full coverage of three-dimensional space. This means that UAVs can reach any hard-to-reach location within the forest, obtaining comprehensive forest data comprising terrain, vegetation distribution, biodiversity, etc. This kind of comprehensive coverage exploration is of great significance for ecological research, forest management, and disaster monitoring. At the same time, it ensures the smoothness of the flight trajectories and collision-free flight, improving accuracy of data collection and safety of the aircraft.

In addition, the transformation and application of this technical solution will provide an efficient technical solution for intelligent extraction of forest sample sites, support forest above-ground biomass estimation and forestry census, and help to achieve national goals of "carbon neutrality" and "carbon peak". This method is also applicable to fields such as close-scope forest remote sensing, forest fire rescue, and forestry surveying, demonstrating broad application prospects and significant commercial values.

The present disclosure innovatively proposes the heuristic waypoint method. The technical solution fills technical gap in this field at home and abroad and provides a reliable solution for quickly exploring large-scale and complex environments. Compared with traditional forest data collection methods, this technical solution significantly improves efficiency of data collection, reduces safety risks of operators, and overcomes the issues of integrity and accuracy of data acquisition, allowing UAVs to fly freely under the forest canopy and obtaining more complete three-dimensional information data. These advantages reflect significant progress and potential value of this disclosure in both technical and practical aspects.

As shown in FIG. 1, the high-efficient autonomous exploration method for the UAVs provided in the present disclosed embodiment includes:

S1, heuristic waypoints generating: setting the exploration scope and the waypoint spacing, and generating waypoints by waypoint generation algorithms; and S2, global path planning: after generating heuristic waypoints, the A * algorithm is used to generate the global planned path; and S3, real-time positioning, and mapping: using point clouds for real-time positioning and mapping; and S4, local B-spline trajectories generating: using B-spline parameterization methods to generate local trajectories; and S5, real-time obstacle avoidance and dynamic feasibility constraints: optimizing the trajectories to achieve fast convergence, generating smooth, collision-free, and dynamically feasible trajectories; and S6, local real-time replanning: using time sliding windows for local replanning; and S7, flight controlling: using UAV control algorithms for controlling UAVs robustly.

The high-efficient autonomous exploration method of the UAVs is an advanced UAV navigation technology, aiming at improving autonomous flight capability in complex environments.

S1, Heuristic Waypoints Generating

In this step, the UAVs first determine the exploration scope, which is usually set based on the predetermined task or current environmental requirements. The distance between waypoints will also be adjusted based on the detection capability and flight characteristics of the UAVs. The heuristic waypoint generation algorithm automatically arranges waypoints based on these parameters, ensuring coverage of all key areas while avoiding ineffective or redundant explorations. This algorithm can intelligently identify terrain features and potential obstacles, thereby effectively planning waypoints.

S2, Global Path Planning

Global path planning is based on heuristic waypoint generation, using the A * search algorithm to find the optimal path connecting these waypoints. The A * algorithm is an efficient path-finding and graph traversal algorithm that can find the shortest path from the starting point to the endpoint. In UAV exploration, this means being able to complete tasks with minimal time and energy consumption.

S3, Real-Time Positioning and Mapping

UAVs collect real-time data of the surrounding environment and generate point cloud maps through sensors mounted on them, such as LiDAR or visual sensors. These data are used to update the location of UAVs and construct detailed 3D maps, ensuring that UAVs have an accurate understanding and cognition of their environment.

S4, Local B-Spline Trajectories Generating

Using B-spline curves, a smooth curve tool of mathematical description, to generate local trajectories. The B-spline curves provide a high degree of flexibility and smoothness, allowing the UAVs' flight trajectories not only to follow global path planning but also naturally adjust flight actions to adapt to real-time detected environmental changes.

S5, Real-Time Obstacle Avoidance and Dynamic Feasibility Constrainting

During flight, the UAVs need to identify and respond to obstacles in the environment in real-time. Through nonlinear optimization techniques, the trajectories can be quickly adjusted to avoid obstacles while maintaining smoothness and efficiency, ensuring flight safety and continuity.

S6, local real-time replanning

The UAVs need to be able to quickly adjust flight plans when encountering unexpected events or environmental changes. This is achieved through a time-based sliding window strategy, which allows UAVs to replan upcoming segments without affecting overall task process.

S7, Flight Controlling

Finally, the UAVs ensure stable and accurate flight through advanced control algorithms. These algorithms are based on dynamic models of UAVs and real-time sensor feedback, adjusting the attitude, speed, and direction of UAVs to perform complex flight tasks and operations.

The high-efficient autonomous exploration method of UAVs provided in this disclosure combines advanced algorithms and real-time data processing, enabling UAVs to operate effectively, safely, and independently in complex and ever-changing environments.

In the high-efficient autonomous exploration method of the UAVs of the present invention, signal and data processing are core technologies to ensure the UAVs can effectively navigate and perform tasks in complex environments. The following are the detailed steps and implementation methods of this process:

S1, Heuristic Waypoints Generating

Signal processing: Firstly, the sensors of the UAVs (such as GPS and IMU) collect environmental data, comprising position, speed, and direction.

Data processing: the exploration scope and waypoint spacing are set according to task requirements and environmental characteristics. The waypoint generation algorithm (based on greedy, random, or rule-based partitioning methods) processes these input data and intelligently generates a series of waypoints covering key areas.

S2, Global Path Planning

Signal processing: utilizing waypoint data obtained from S1.

Data processing: Use the A * algorithm to process waypoint data and find the optimal path to connect these waypoints. This calculation involves evaluating the cost and total travel time of each step, ensuring the shortest path, and avoiding known obstacles.

S3, Real-Time Positioning and Mapping

Signal processing: UAVs collect real-time point cloud data of surrounding environments through LiDAR or vision systems.

Data processing: point cloud data is processed in real-time and fused with existing map data, updating the precise position of UAVs, and establishing or updating a three-dimensional map of the environment.

S4, Local B-Spline Trajectories Generating

Signal processing: receiving updated location information and environmental maps obtained from S3.

Data processing: Using the B-spline curve method, generating smooth local flight trajectories based on global path planning results and real-time environmental data. This process involves adjusting the control points of the curves to adapt to the dynamic changes in the path.

S5, Real-Time Obstacle Avoidance and Dynamic Feasibility Constraints

Signal processing: continuing to collect real-time data of the environment, especially obstacles information.

Data processing: nonlinear optimizing the local trajectories, adjusting flight paths to avoid newly discovered obstacles while maintaining trajectories smoothness and dynamic feasibility of flight.

S6, Local Real-Time Replanning

Signal processing: collecting necessary environmental and flight status data when encountering unforeseeable obstacles or environmental changes.

Data processing: applying time sliding window strategy to replan upcoming trajectory segments quickly. This includes real-time adjustment of the control points of the B-spline curve to respond to environmental changes.

S7, Flight Controlling

Signal processing: processing feedback signals from flight power systems and sensors, including velocity, attitude, and acceleration data.

Data processing: UAV control algorithms (such as PID control, fuzzy logic, or neural network controllers) adjust control instructions based on flight tasks and local trajectory requirements to ensure the UAVs follow the optimized flight trajectories robustly.

The signal and data processing procedures provided in this disclosure ensure UAVs can navigate efficiently, accurately, and safely throughout all flight stages, enabling to autonomously perform various tasks in complex environments.

Figure 2:
FIG. 2 is a module diagram of the high-efficient autonomous exploration system for UAVs provided in the present disclosed embodiment.

As shown in FIG. 2, the high-efficient autonomous exploration system of the UAVs provided in this disclosed embodiment includes:

heuristic waypoint generation module: setting the exploration scope and the waypoint spacing, and generating waypoints through waypoint generation algorithms; and global path planning module: after generating heuristic waypoints, the A * algorithm is used to generate the global planning path; and real-time positioning and mapping module: using point clouds for real-time positioning and mapping; and local B-spline trajectories generation module: using the B-spline parameterization method to generate local trajectories; and real-time obstacle avoidance and dynamic feasibility constraint module: optimizing trajectories to achieve fast convergence, generate smooth, collision-free, and dynamically feasible trajectories; and local real-time replanning module: using the time sliding windows for local replanning; and flight controlling module: using UAV control algorithms for controlling UAVs robustly.

The high-efficient autonomous exploration method for UAVs in complex and unknown forest environments is provided in the present disclosed embodiment, with specific implementation steps as follows:

Step 1: Heuristic Waypoints Generating (1) Exploration Scope Setting

According to actual needs, setting the exploration scope of sample sites, such as defining length, width, and height dimensions (minX, maxX, minY, maxY, minZ, maxZ).

(2) Waypoint Spacing Setting

Generating 3D waypoints by traversing the entire exploration space, and setting step sizes in three directions: length, width, and height. The step sizes in three directions are determined according to the actual situation. Here is an example, the step sizes in the length and width directions are set to be equal, represented by StepXY, and the step sizes in the height direction are represented by StepZ.

(3) Waypoint Generation Algorithm

The present disclosure traverses and explores the entire unknown space by using different waypoint generation strategies in an exploration space. Therefore, three methods are proposed in the disclosure. Firstly, the idea of lateral layering is adopted. Firstly, a waypoint is generated within a plane with a certain step size to traverse the entire space; then, based on the step size in the height direction, the waypoint for the next plane is generated until the entire space is traversed. Secondly, adopting the idea of vertical undulation, the generated waypoints interval undulation; wherein the maximum and minimum scope of interval undulation can be set to be consistent until the entire space is traversed. Thirdly, in order to obtain more complete data for the single tree, a series of waypoints are generated through the idea of spiral ascent. For the specific algorithm flow, see Algorithm 1, Algorithm 2, Algorithm 3.

---

Algorithm 1: lateral layered waypoint generation

```
input:   minX, maxX, minY, maxY,
                      minZ, maxZ, stepXY, stepZ
output:  a series of waypoints
 1    Waypoints ← empty set;
 2    for z ← minZ + stepZ to maxZ 2·stepZ do
 3       |    for y ← minY + stepXY to maxY 2·stepXY do
 4       |       |    for x ← minx + stepXY to maxX – stepXY stepXY do
 5       |       |       |           Waypoints.push(<x, y, z>);
 6       |       |    end
 7       |       |    y ← y + stepXY;
 8       |       |    for x ← maxX – stepXY to minX + stepXY –stepXY do
 9       |       |       |  Waypoints.push(<x, y, z>);
10       |       |    end
11       |       |    y ← y – stepXY;
12       |    end
13       |    z ← z + stepZ;
14       |    if z > maxZ then
15       |       |           break;
16       |    end
17       |    for y ← maxY – stepXY to minY –2·stepXY do
18       |       |    for x ← minX + stepXY to maxX – stepXY stepXY do
19       |       |       |  append (x, y, z) to Waypoints;
20       |       |    end
21       |       |    y ← y – stepXY;
22       |       |    for x ← maxX – stepXY to minX + stepXY –stepXY do
23       |       |       |  Waypoints.push(x,y,z);
24       |       |    end
25       |       |    y ← y + stepXY;
26       |    end
27       |    z ← z – stepZ;
28    end
29    return Waypoints;
```

```
Algorithm 2: Vertical undulating waypoint generation input:  minX, maxX, minY, maxY,
           minZ, maxZ, stepXY
output:  a series of waypoints
  1     Waypoints ← empty set;
  2     isTop ← false;
  3     z ← minZ;
  3     for y ← minY + stepXY to maxY 2·stepXY do
  4     |      for x ← minX + stepXY to maxX stepXY do
  5     |      |      if is Top then
  6     |      |      |   z ← maxZ;
  7     |      |      end
  8     |      |      else
  9     |      |      |   z ← minZ;
 10     |      |      end
 11     |      |      isTop ← !isTop;
 12     |      |      Waypoints.push(<x, y, z>);
```

```
Algorithm 2: Vertical undulating waypoint generation

13     |      end
 14     |      for x ← maxX − stepXY to minX −stepXY do
 15                  if isTop then
 16                  |   z ← maxZ;
 17                  end
 18                  else
 19                  |   z ← minZ;
 20                  end
 21                  isTop ← !isTop;
 22                  Waypoints.push(<x, y + stepXY, z>);
 23     |      end
 24     end
 25     return Waypoints;
```

```
Algorithm 3: Spiral ascent waypoint generation input:   X, Y, R, numSpiralSegments, minZ, maxZ, stepZ
output:  a series of waypoints
  1      Waypoints ← empty set;
  2      Point2D ← empty list of tuples;
  3      δAngle ← 2π/numSpiralSegments;
  4      for i ← 0 to numSpiralSegments − 1 do
  5      |       Append tuple (X+R· cos(δAngle · i), Y+R· sin(δAngle · i)) to
  6      |       Point2D
  7      end
         Index ← 0;
 14      for z ← minZ + stepZ to maxX stepZ do
 15      |       if Index = length of Point2D then
 16      |       |   Index ← 0;
 17      |       end
 18      |       Append tuple (Point2D[Index].x;Point2D[Index].y; z) to
 19      |       Waypoints;
 20      |       Index ← Index + 1;
 21      end
 25      return Waypoints;
```

Wherein, X and Y are plane coordinates of a single tree, R is a radius of flying around the tree, the numSpiralSegments represents a number of points generated on the spiral path and a number of segments in the spiral path.

Step 2: Global Path Planning

After generating heuristic waypoints, the A * algorithm is used to generate the global planning path, detailed steps are as follows:

(1) initializing 1) determining starting and target points as starting and ending nodes for the A * algorithm, and 2) creating an open list to store nodes to be expanded, and a closed list to store nodes have already been expanded, and 3) adding the starting node to the open list, setting an initial cost to 0, and calculating a heuristic estimate value, and (2) iterative looping entering a loop until the open list is empty or a target node is found, and (3) iterative looping selecting a node from the open list, the node should be provided with the lowest total cost (a cost+the heuristic estimate value), and the node will become a current expansion node, and (4) node expanding: expanding the current expansion node by finding adjacent feasible nodes (waypoints), calculating the cost and the heuristic estimate value, and adding to the open list, and (5) checking adjacent nodes performing following checks for each adjacent node:

1) if the node is already in the closed list, skipping and no longer considering, and 2) if the node is not in the open list, adding to the open list and setting a parent node as a current extension node, and 3) if the node is already in the open list, comparing a current path cost with an existing path cost, selecting a smaller cost path, and updating the parent node to the current expansion node, and (6) termination condition checking if the target node appears in the open list (indicating a path to target has been found), or if the open list is empty (indicating the path cannot be found), terminating looping, and (7) refactoring path if the path is found, starting from the target node and tracing back to the starting node through a parent node pointer to obtain a final path, and (8) returning result returning the generated global path or indicating the path cannot be found.

Step 3: Real-Time Positioning and Mapping

In the present disclosure, point clouds are used for real-time positioning and mapping. It should be noted that in addition to using LiDAR sensors, the algorithm disclosed can also be implemented by depth cameras. In addition, for open areas, real-time dynamic difference (RTK) can be used to provide accurate location services based on global navigation positioning systems (GNSS). Taking LiDAR as an example, the following steps will be elaborated in detail:

(1) data acquiring collecting environmental data through LiDAR sensors to obtain laser point cloud data; the point cloud data containing location information of objects in the environment, and (2) feature extracting extracting features from the laser point cloud data, such as ground features, tree trunk features, etc; these features will be used for subsequent location and mapping processes, and (3) motion estimating estimating robots' motion (pose transformation) by comparing feature point changes between consecutive frames; and (4) data associating associating features of the current frame with previously established map features to identify the feature points in the known map matching with the current frame, and (5) map updating based on the results of data association, updating the map, and adding new feature points to the map, and (6) location updating based on the results of motion estimation and data association, updating position estimation of the robots, the robots here specifically refer to the UAVS, and (7) looping detecting detecting whether a loop has occurred, that is, whether the robots have returned to the previously explored position during the exploration process; looping detection can avoid accumulated errors, and (8) optimizing optimizing the trajectories of the map and robots to reduce cumulative errors by using optimization methods such as graph optimization.

Step 4: Local B-Spline Trajectories Generating

The present disclosure uses the B-spline parameterization method to generate local trajectories. Because B-splines have lots of beneficial properties. Especially, it can provide local control, allowing the present disclosure to finely adjust local parts of the trajectories while also maintaining convex hull characteristics of the trajectories. In addition, in order to enhance the practicality of the method, uniform B-splines are used in this disclosure to represent trajectories, because the uniform B-splines are very convenient for calculating the position of trajectory points in a closed form, which is helpful for calculating and evaluating in practical applications.

A B-spline of degree p is a piecewise polynomial function defined by a series of discrete control points $\{P_0, P_1, \ldots, P_N\}$ and node vectors $[t_0, t_1 \ldots t_m]$, wherein $t_{m+1}-t_m$ is the same time interval $\Delta t_m$, and wherein $P_i \in \mathbb{R}^3$, $t_m \in \mathbb{R}$, and $m=N+p+1$, values of the B-spline can be represented by a matrix:

$$B(s) = \begin{bmatrix} 1, s, s^2, \ldots, s^p \end{bmatrix} \cdot M_{p+1} \cdot [P_{m-p}, P_{m-p+1}, P_{m-p+2}, \ldots, P_m]^T \quad (1)$$

Here, $M_{p+1}$ is a constant matrix depends only on the parameter p, in the present disclosure, the p is 3, while $s=(t-t_m)/(t_{m+1}-t_m)$, wherein t belongs to an interval $[t_m, t_{m+1})$.

Step 5: Real-Time Obstacle Avoidance and Dynamic Feasibility Constraints

The uniform B-spline has the same time interval $\Delta t$, and calculation formulas for velocity $V_i$ of control points $P_i$, acceleration $A_i$, and jerk $J_i$ are as follows:

$$V_i = \frac{P_{i+1} - P_i}{\Delta t}, A_i = \frac{V_{i+1} - V_i}{\Delta t}, J_i = \frac{A_{i+1} - A_i}{\Delta t} \quad (2)$$

based on the convex hull characteristic of B-splines, it becomes easier to optimize the trajectories to achieve fast convergence, generating smooth, collision-free, and dynamically feasible trajectories. Therefore, it can be optimized in terms of safety, smoothness, and dynamic feasibility by addressing following issues:

$$J = \omega_s J_s + \omega_c J_c + \omega_d J_d \tag{3}$$

wherein: $J_s$, $J_e$ and $J_d$ respectively represent penalty terms for smoothness, collision, and dynamic feasibility, $\omega_s$, $\omega_c$ and $w_d$ are the weights corresponding to these three cost items, respectively.

In this invention, the smoothing term is modeled by the square of the acceleration and the jerk (i.e. rate of change in acceleration) of the B-spline control point, aiming to minimize high-order derivatives and ensure smoothness of overall trajectories. Expression of the $J_s$ is as follows:

$$J_s = \sum_{i=1}^{N-1} \|A_i\|_2^2 + \sum_{i=1}^{N-2} \|J_i\|_2^2 \tag{4}$$

When the distance between the trajectories and the obstacles is less than a certain threshold, the collision cost $J_e$ increases rapidly, which can be expressed by the repulsive force exerted by the obstacle on each control point.

$$J_c = \sum_{i=p_b}^{N-p_b} \mathcal{F}(d(Q_i), d_{min}) \tag{5}$$

wherein: $d_{min}$ is expected minimum safe distance threshold, $\mathcal{F}(\cdot)$ is a penalty function for general variables.

$$\mathcal{F}(x, y) = \begin{cases} (x - y)^2 & x \le y \\ 0 & x > y \end{cases} \tag{6}$$

The dynamic feasibility term $J_d$ is used to limit maximum speed and acceleration, and its expression is as follows:

$$J_d = \Sigma_{\mu \in x,y,z} \left\{ \sum_{i=p_b-1}^{N-p_b} \mathcal{F}(v_{max}^2, V_{i,\mu}^2) + \sum_{i=p_b-2}^{N-p_b} \mathcal{F}(a_{max}^2, A_{i,\mu}^2) \right\} \tag{7}$$

wherein: $V_{i,\mu} = [V_{i,x}, V_{i,y}, V_{i,z}]^T$ and $A_{i,\mu} = [A_{i,x}, A_{i,y}, A_{i,z}]^T$ represent the velocity and acceleration of the control points respectively.

Step 6: Local Real-Time Replanning

When UAVs conduct autonomous flight exploration in complex and unknown environments, timely and effective replanning is a necessary function to ensure that UAVs avoid collision flight due to the limited sensing scope of their airborne sensors. Considering the actual scope of airborne sensors and computing resources, global replanning is neither feasible nor necessary. Therefore, it is necessary to maintain a real-time sliding local map for local trajectory planning, which also includes obstacles and updates ESDF accordingly.

In this disclosure, a time-sliding window is used for local replanning. Here is an example of real-time local planning in a complex scene represented by a forest scene, as shown in FIG. 3 from top to bottom.

Figure 3:
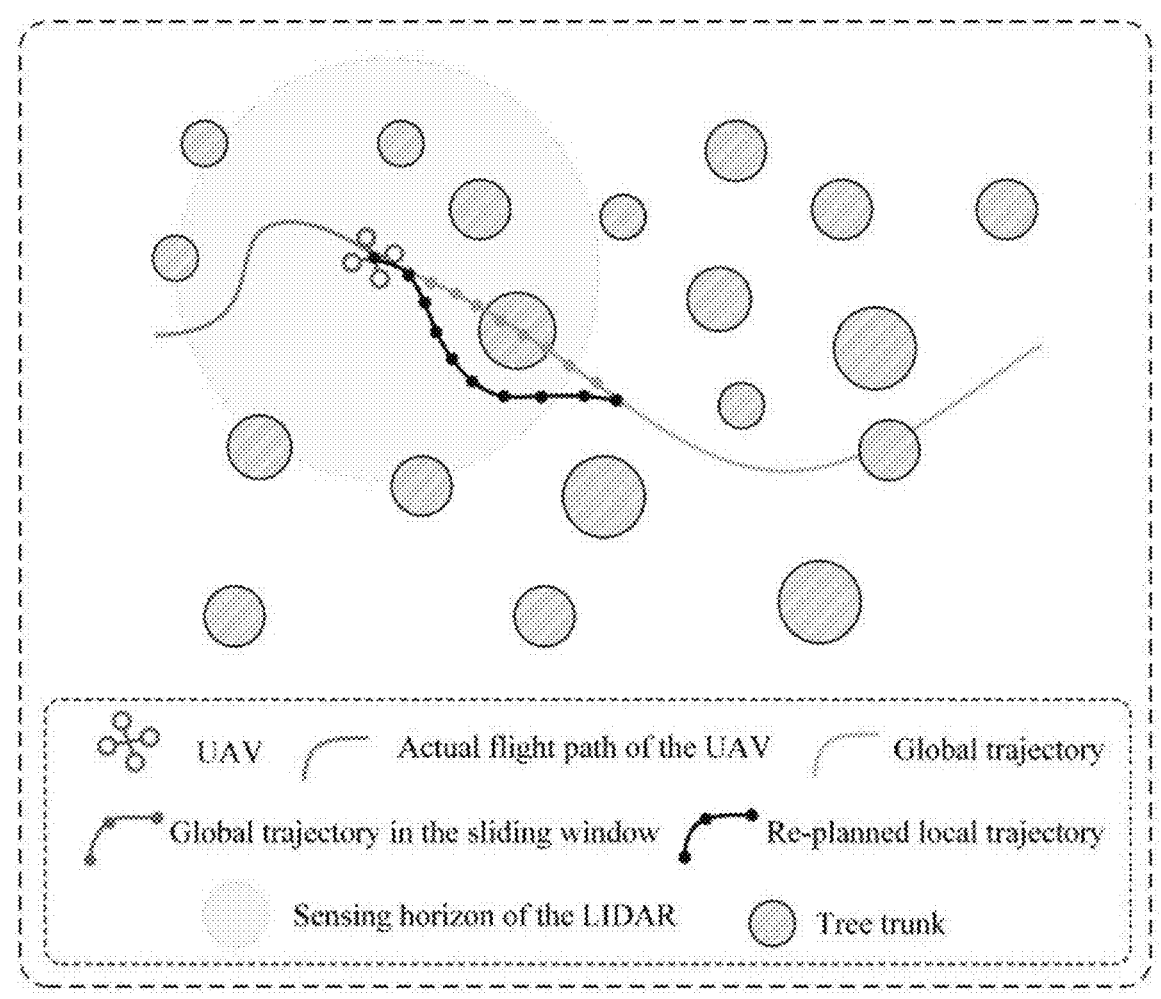
FIG. 3 is a schematic diagram of online real-time replanning mechanism in the complex forest scene provided in the present disclosed embodiment.

According to FIG. 3, when the sliding window detects a local trajectory passing through an obstacle, it will trigger a trajectory replanning mechanism. Then generate new local trajectories to avoid obstacles and ensure the safety of the UAVs. Subsequently, the new local trajectory is reintegrated into the global trajectories.

When UAVs conduct autonomous flight exploration in unknown and complex environments, timely and effective replanning is a necessary function to ensure UAVs collision-free flight due to the limited sensing scope of their airborne sensors. Considering the actual limitations of airborne perception scope and computing resources, global replanning is neither feasible nor necessary. Therefore, maintaining an airborne real-time sliding local map to serve local trajectory planning, integrating obstacles in this map, and updating the ESDF accordingly. In this invention, a time-sliding window is applied to the global trajectories for local replanning within it. As shown in FIG. 3, the forest scene represents a typical complex environment, in which UAVs conduct fully autonomous flight navigation, and the risk of collision is extremely high.

According to FIG. 3, when the sliding window detects the global planning trajectories passing through obstacles or the local planning trajectories are too close to obstacles, it will trigger a trajectory replanning mechanism, and then generate a new local planning trajectory to avoid obstacles and ensure safe flight of the UAVs. Subsequently, the new local planning trajectories are reintegrated into the global planning trajectories.

Step 7: Flight Controlling using UAV control algorithms for controlling UAVs robustly.

Figure 4:
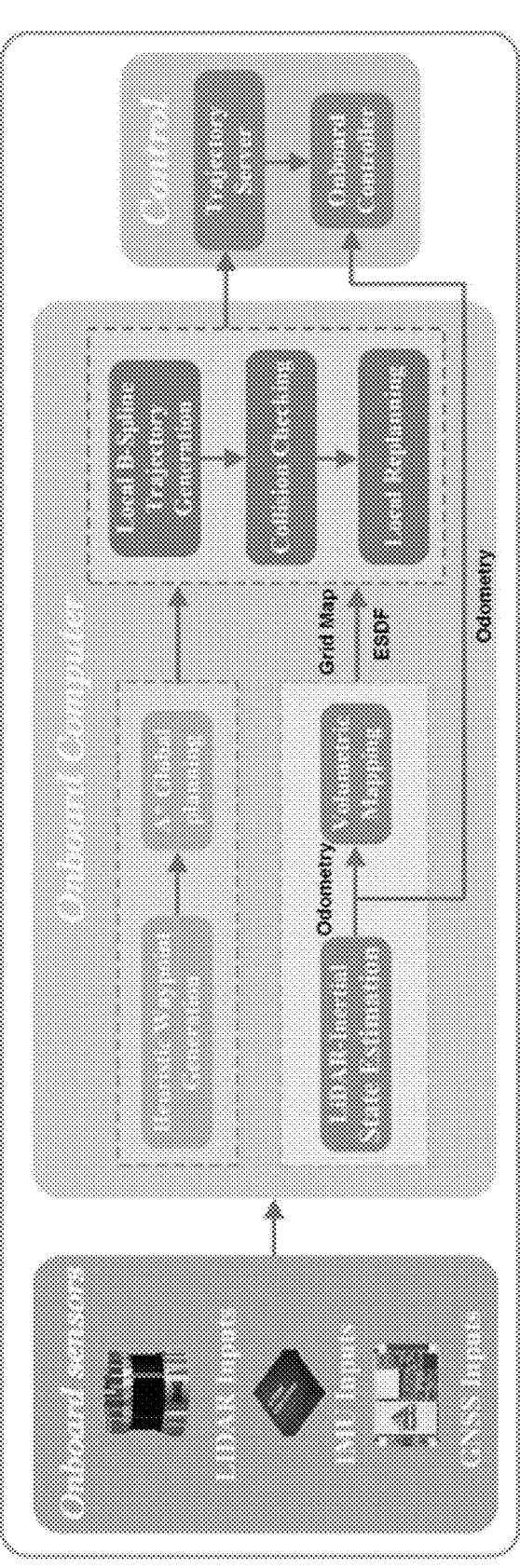
FIG. 4 is an algorithm flowchart provided in the present disclosed embodiment.

The algorithm flowchart of a high-efficient autonomous flight exploration method for UAVs in complex and unknown environments is shown in FIG. 4.

In order to make the purpose, technical solution, and advantages of this disclosure clearer, the following will provide further detailed explanations of this disclosure in conjunction with embodiment. It should be understood that the specific embodiment described here is only intended to explain this disclosure and is not intended to limit it.

The technical solution of this disclosed embodiment:

taking complex forest scenes as an example, the technical solution for UAVs to carry out high-efficient autonomous exploration methods are as follows:

Heuristic waypoint and global planning path-generating

Figure 5:
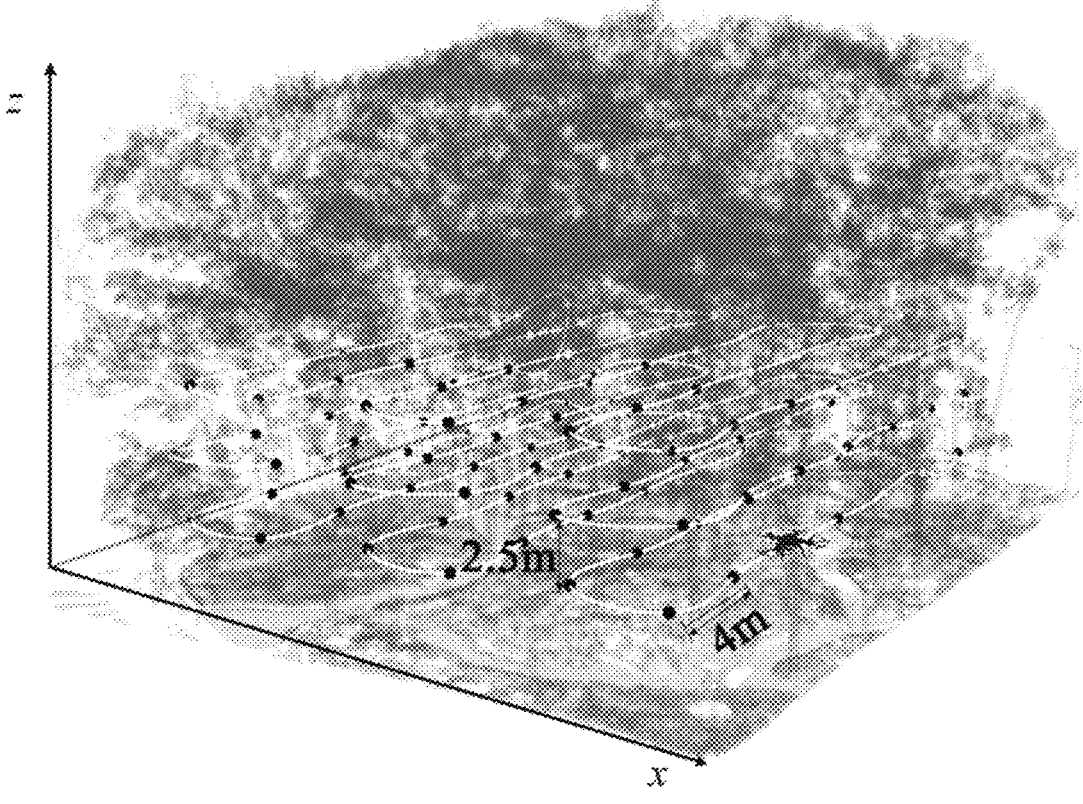
FIG. 5 is a schematic diagram of scene-setting of the lateral layered waypoint generation embodiment provided in the present disclosed embodiment.
Figure 6:
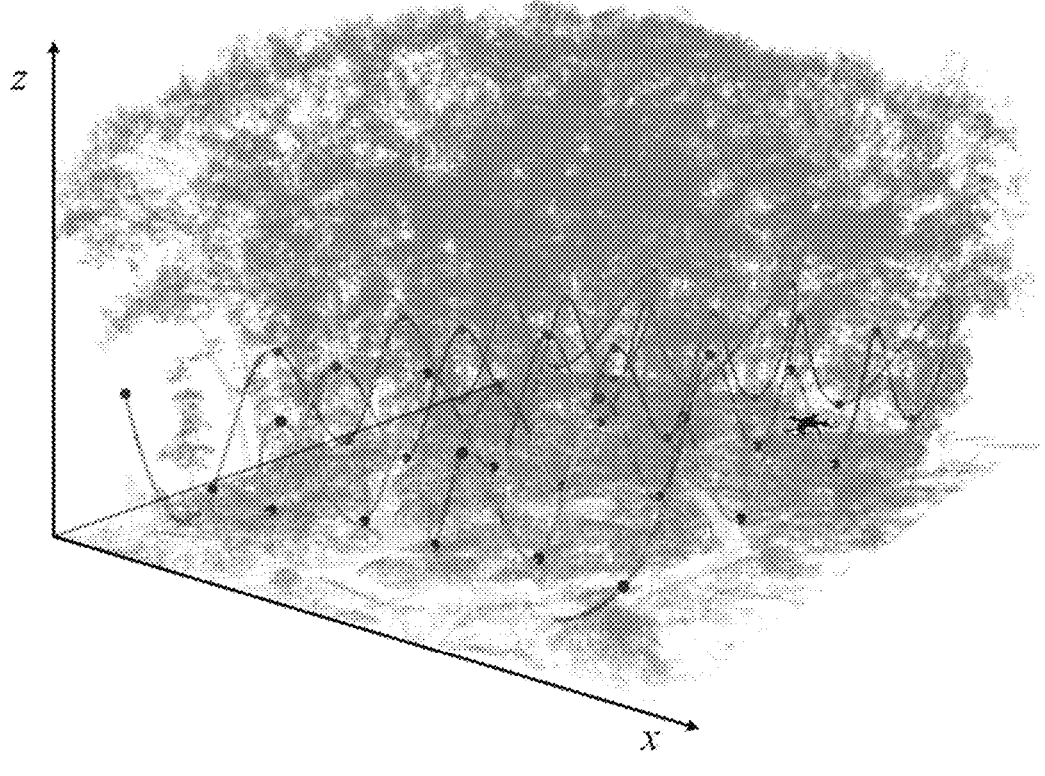
FIG. 6 is a schematic diagram of scene-setting of the longitudinal undulating waypoint generation embodiment provided in the present disclosed embodiment.
Figure 7:
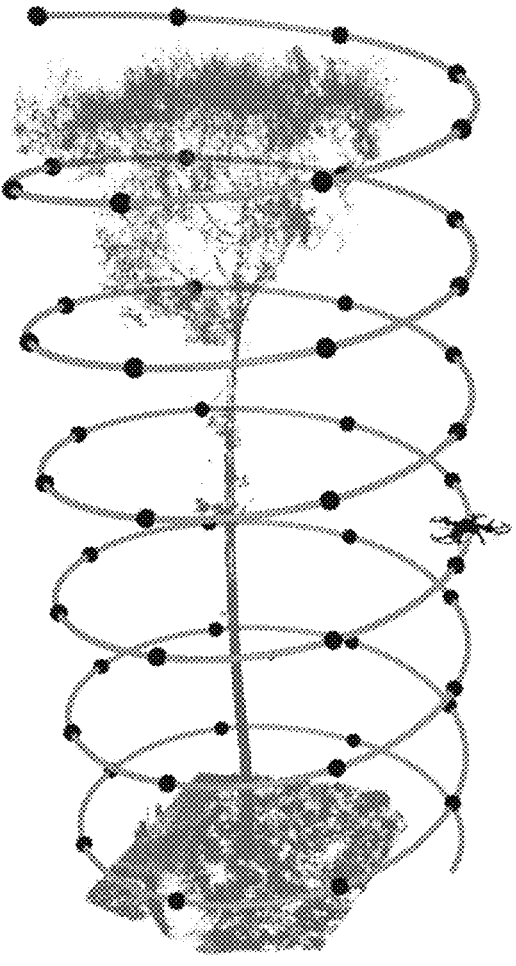
FIG. 7 is a schematic diagram of scene-setting of the spiral upward waypoint generation embodiment provided in the present disclosed embodiment.

In forest, setting an exploration scope similar to a rectangular, such as a 40-meter-long, 30-meter-wide, and 8-meter-high exploration scope. Setting the spacing between planar waypoints to 4.0 meters and the spacing between waypoints in the elevation direction is 2.5 meters. As shown in FIGS. 5, 6, and 7, there are three examples of generating three types of waypoints, wherein black dots are the waypoints generated using the algorithm proposed in this disclosure, and continuous curves are a series of global planning paths generated by the A * algorithm, Dijkstra, or JPS. The global planning paths generated in this disclosure not only consider superiority in time but also full coverage in space.

The lateral Layered Waypoint Generation (LLWG) algorithm first generates waypoints at intervals of a certain step size in a horizontal plane, and then rises vertically to another plane with a certain step size. As shown in FIG. 5, the black dots represent the generated waypoints. In this case, the lateral step size is 4 meters and the vertical step size is 2.5 meters. The specific implementation process can be found in Algorithm 1.

The Vertical Undulating Waypoint Generation (VUWG) algorithm directly considers the elevation changes of waypoints when generating waypoints, and traverses the entire forest sample sites with certain intervals of undulating changes. As shown in FIG. 6, the black dots represent the generated waypoints. In this case, the lateral step size is 4 meters and the vertical step size is 4 meters. The specific implementation process can be found in Algorithm 2.

Figure 8:
FIG. 8 is a schematic diagram of the scene-setting of the embodiment of the autonomous flight waypoint generation of UAVs up and down in a forest canopy provided in the present disclosed embodiment.

As shown in FIG. 7, the spiral ascent autonomous exploration method can obtain complete point cloud data of the entire target tree. By setting a certain radius, vertical exploration scope, and vertical waypoint step size, the spiral ascent waypoint is generated. The specific implementation process is shown in Algorithm 3. As shown in FIG. 8, for autonomous flight of UAVs up and down the forest canopy, Algorithm 1 or Algorithm 2 is first used to complete exploring under the forest canopy, and then fly autonomously to the canopy from the gaps under the forest. In addition, the present invention also considers a waypoint generation method for UAVs autonomous flight up and down forest canopy, taking into account the overall nature of the exploration sites, and obtaining more comprehensive forest site plot data.

(2) Localization, Perception, and Recognition of Complex Forest Environments

Using active and passive multi-source sensors, such as cameras, LiDAR, etc., to achieve multimodal perception, localization, and mapping of forest environment. Integrating perception data to construct a three-dimensional map and obstacle model of the forest environment.

(3) Real-Time Perception of Local Path Planning

Based on the perceptual data, environmental models, and pre-generated global planning paths, the local path planning algorithm proposed in this disclosure is used to generate the flight path of the UAVs. In complex forest environments, it is necessary to avoid trees and other obstacles in a timely manner, while also considering the impact of terrain undulations.

(4) Real-Time Dynamic Obstacle Avoidance and Trajectory Replanning

Integrating real-time obstacle avoidance function, utilizing sensor data to monitor obstacles on the flight path in real-time. When obstacles are detected that pose a threat to the UAVs' flight, the dynamic replanning function is triggered in a timely manner to bypass the obstacles and ensure the safe flight of the UAVs. By utilizing computer vision and deep learning technologies, UAVs can recognize and avoid dynamic obstacles such as birds or other flying animals in real-time.

(5) Execution of Data Collection Tasks

During the autonomous exploration of UAVs, forest environmental data is collected, such as LiDAR and video streams, for subsequent using in forest vegetation parameter extraction, biomass estimation, and other research.

Technical Effects of this Disclosed Embodiment

Figure 9:
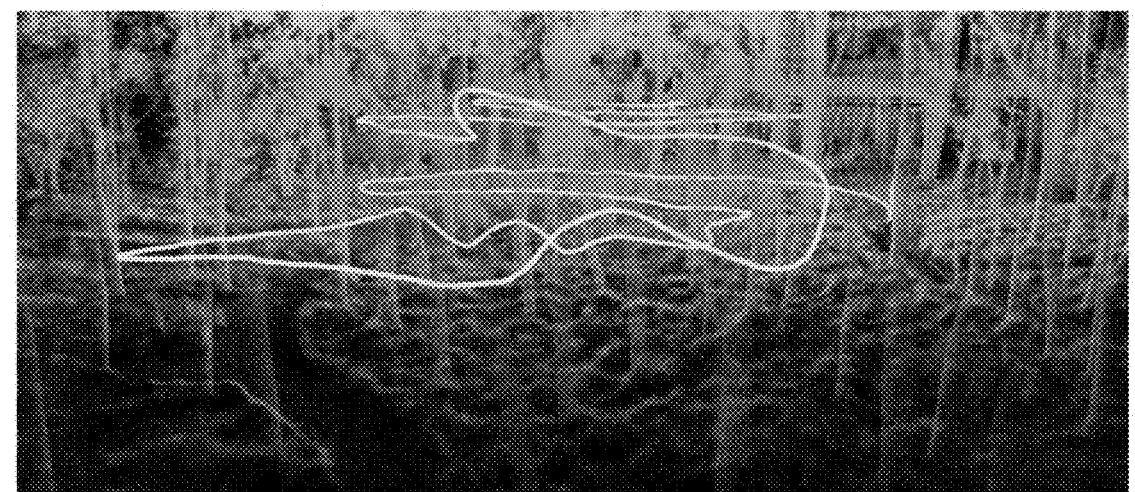
FIG. 9 is a real-time point cloud map and a flight trajectory map of UAVs provided in the present disclosed embodiment.
Figure 10:
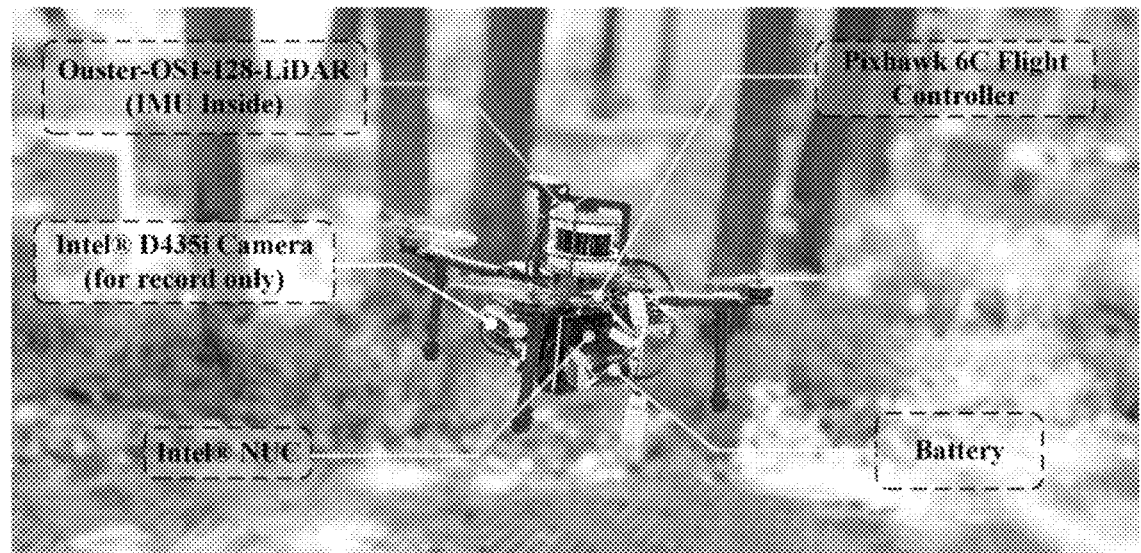
FIG. 10 is an architecture diagram of aircraft platform in the present disclosure.

The autonomous exploration flight results of the UAVs in this disclosed embodiment are shown in FIG. 9. The UAVs successfully completed exploration of the designated area in a short period of time and achieved collision-free and fast autonomous flight. FIG. 9 shows the real-time point cloud map and UAVs flight trajectory map provided by the lateral layered waypoint generation method of this disclosed embodiment, with a maximum exploration altitude setting at 6 meters. The vertical waypoint interval is 2.5 meters, and the flight trajectory of the UAVs will be divided into two layers for exploration. The higher the UAVs are above the ground, the greater the probability of encountering smaller obstacles (such as branches). Therefore, achieving rapid flight exploration without collisions has become more challenging. The UAVs successfully completed exploration of the preset area within 252.7 seconds, with a flight distance of 142.0 meters. As shown in FIG. 10, the disclosed aircraft platform is a compact modular platform developed independently for autonomous exploration flight experiments. This platform is equipped with an Intel NUC mini computer, equipped with an Intel i7-1260P processor, with a maximum frequency of 4.7 GHz. Equipped with 32 GB of memory and 1 TB of SSD. The disclosed aircraft are equipped with a 3D Ouster OS1-128 LiDAR and an InvenSense ICM-20948 Inertial Measurement Unit (IMU) for perception and positioning. In order to ensure real-time processing capability, due to limited airborne computing resources, LiDAR real-time computing requires reducing the data to 32 scanning lines. However, the original point cloud data can be stored in real-time on the computer for subsequent offline analysis. In addition, the Intel D435i RGBD camera and T265 binocular grayscale fisheye camera can not only to record flight reality from a first-view perspective but also for visual positioning and mapping. The flight controller unit is Pixhawk 6C. The power system consists of four brushless motors, each equipped with a seven-inch three-bladed propeller and a four in one electronic speed controller (ESC). The communication between the flight controller and the airborne computer is achieved through the Universal Asynchronous Transceiver (UART) hardware interface. The aircraft is powered by a 10000 mAh aircraft model battery. For online visualization and monitoring, the present disclosure utilizes a wireless local area network (WLAN) to establish a connection with airborne computers. Open-source software Nomachine and QGroundControl (QGC) are used for remote display, monitoring, and sending control commands.

The real-time perception processing system mainly consists of an Intel NUC i7-1260P computing unit, a 3D high beam high-precision Ouster OS1 128 line LiDAR, an Intel D435i depth camera, and an Intel T265 grayscale binocular fisheye camera. The development of various functions is based on the Linux ROS Noetic environment. The airborne system mainly includes a Holybro Pixhawk 6C flight controller, built-in MEMS sensors in flight control, airborne signal receiver, airborne data transmission module, and a power system composed of a four-in-one electric controller, brushless motor, and propeller.

Figure 11:
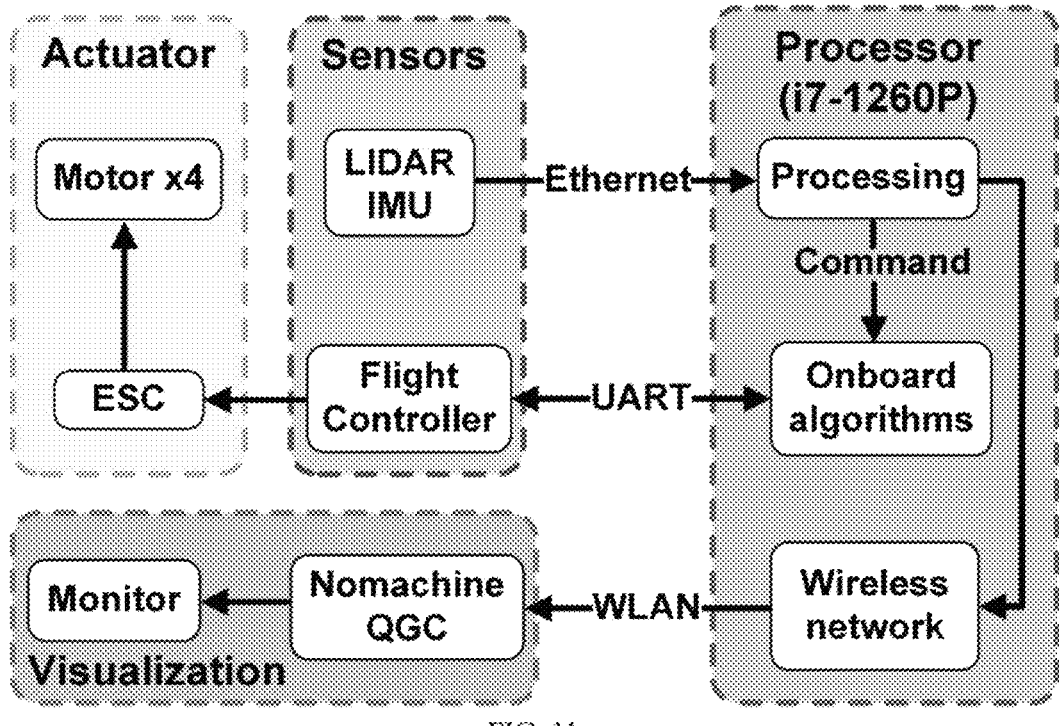
FIG. 11 is a hardware architecture diagram of the aircraft platform in the present disclosure.

The hardware architecture diagram of the present disclosed aircraft platform is shown in FIG. 11, wherein communication between the flight controller and the airborne computer is achieved through a Universal Asynchronous Transceiver/Transmitter (UART) hardware interface. The four-axis aircraft is powered by a model aircraft battery and has a capacity of 10000 milliamperes. For online visualization and monitoring, we establish connections between wireless local area network (WLAN) and airborne computers. We use open-source software Nomachine and QGroundControl for remote display, monitoring, and sending control commands. Based on this platform, the autonomous exploration flight results of the UAVs in this disclosed embodiment are shown in FIG. 9. The UAVs successfully completed the exploration of the designated area in a short period of time and achieved collision-free and fast autonomous flight.

Figure 12:
FIG. 12 shows a testing scene in this public experiment.

In order to compare and analyze the exploratory performance of the method proposed in this disclosure, a series of comparative simulation experiments were conducted in forest environments. Compare this disclosure with the classic method NBVP explored independently, as well as the latest FAEP and FUEL algorithms. In order to improve perception accuracy, the sensing range of the LiDAR has been configured to 50.0 meters and the frequency is 10.0 Hz. Among all methods, this disclosure maintains certain limitations on the maximum speed and acceleration of the aircraft, which are 2.0 m/s and 2.0 m/s², respectively. In each experiment, all methods were tested 5 times, and all tests were conducted on Intel Core i7-10750H@3.2 GHz On CPU and 40 GB of memory. The size of the test scene is 53×41×23 cubic meters. Due to the presence of dense tree canopies above 8 meters, the exploration scope of this disclosure is set to 53×41×8 cubic meters, and the UAV flight exploration time is set to 1200 seconds or 20 minutes. The scene of the embodiment is shown in FIG. 12. The experimental testing scene was collected by a Leica RTC360 ground-based LiDAR scanner on a millimeter scale. This sample site is a typical urban forest in a subtropical monsoon region, and the main tree species in the sample site are camphor trees. The total number of reference trees at the experimental site is 143, and the sample site density is 953 trees per hectare.

Figure 13:
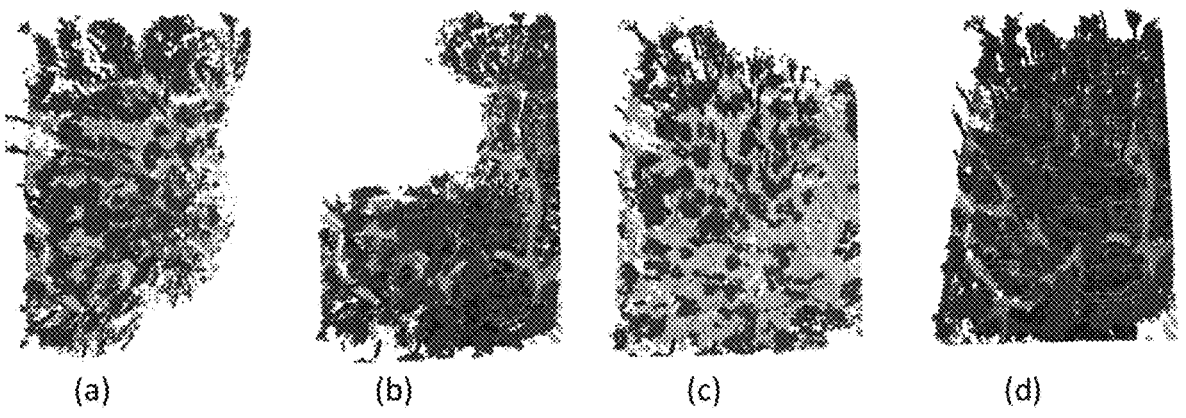
FIG. 13 shows execution trajectories of all benchmark methods of the sample sites in the present disclosure; wherein: (a) represents NBVP, (b) represents FUEL, (c) represents FAEP, and (d) represents the method proposed in the present disclosure.

FIG. 13 shows the execution trajectories of all benchmark methods in the testing scenes, wherein NBVP, FUEL, and FAEP were unable to explore the entire experimental area within the specified 1200-second time. In addition to limitations on exploration time, these algorithms have a certain degree of blindness in an autonomous exploration of large and complex environments. Compared to FUEL, FAEP reduces some ineffective back-and-forth maneuvers, thus covering a larger exploration area. In this case, NBVP has the lowest exploration efficiency. The longitudinal undulation waypoint generation method proposed in this study yields more complete mapping results and the highest exploration efficiency.

Figure 14:
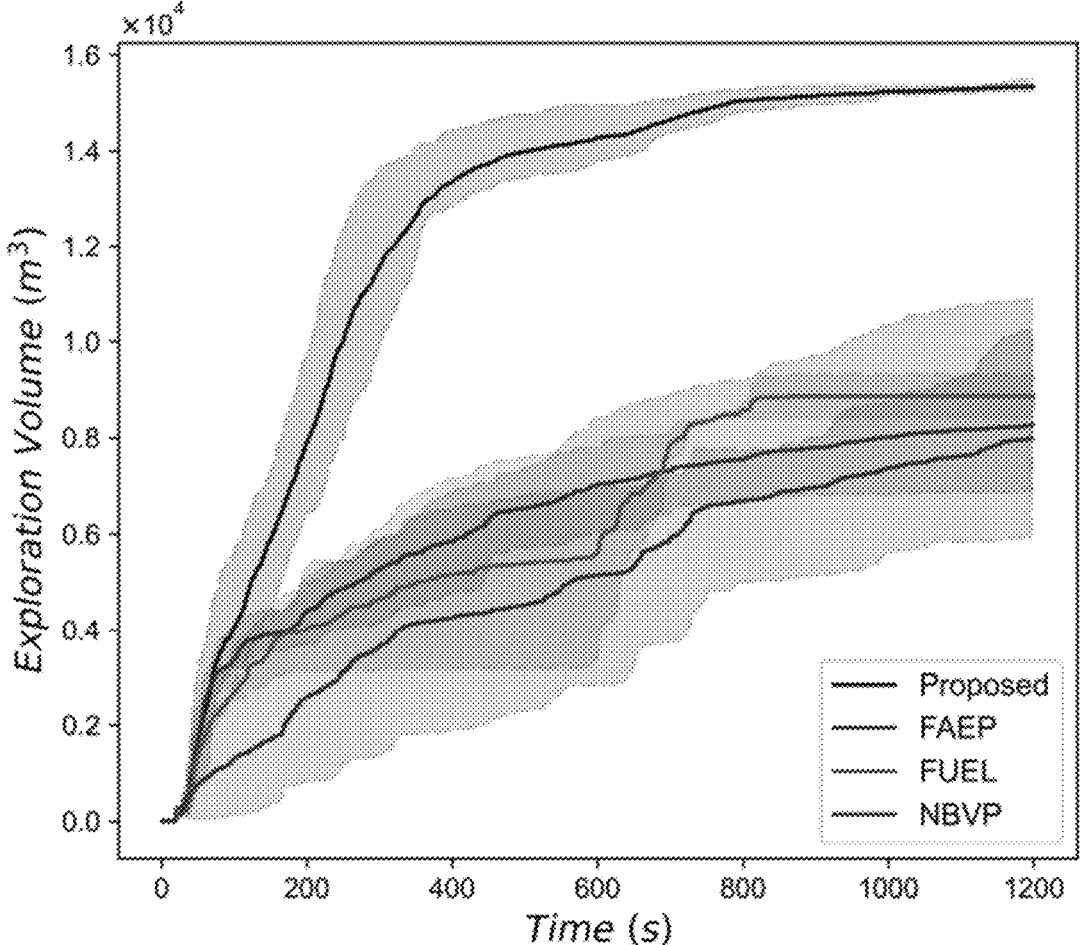
FIG. 14 shows the changes in exploration volume over time for all the comparison methods in FIG. 13.

According to the results shown in FIG. 14, the classical exploration method NBVP and the latest exploration methods FUEL and FAEP were unable to explore the entire experimental area. This is not only due to the limitation of exploration time, but also related to a certain degree of blindness in exploring large-scale and complex environments. FAEP is an enhanced version of FUEL, reducing some ineffective back-and-forth maneuvers, thus covering a larger exploration area than FUEL.

The method proposed in this disclosure completed the exploration of the entire region in all five tests while ensuring the absence of ineffective back-and-forth maneuvers. This achievement is of particular significance in complex and large-scale forest environments, as thorough and sufficient regional coverage helps to collect complete forest data. The method proposed in this disclosure undoubtedly represents a fast and effective data collection solution for forestry surveying, forest biomass estimation, and other fields.

FIG. 14 shows the variation of exploration volume over time for all comparison methods in FIG. 13. It can be clearly seen from the figure that at around 800 seconds, the volume explored by the method proposed in this disclosure tends to converge. This indicates that the disclosed method can complete the entire space exploration in about 800 seconds, while all other methods cannot complete the exploration of the experimental area within the specified 1200-second time scope. Considering the width between the upper and lower bounds of the exploration volume, the method demonstrated robust stability in five tests. According to FIG. 5, the average volume explored by the method proposed in this disclosure is approximately twice that of other methods, with an exploration average volume of 15341.5 cubic meters. The vertical undulating waypoint generation (VUWG) and lateral layered waypoint generation (LLWG) algorithms proposed in the present invention have optimal exploration efficiency. The two algorithms proposed in this invention tend to converge in exploration volume at approximately 800 seconds, indicating that the proposed method can complete the exploration of the entire space within approximately 800 seconds. In comparison, all other methods were unable to complete the exploration of Plot2 within 1200 seconds. The time of 1200 seconds represents the maximum flight duration of a typical small UAV. According to FIG. 14, the average exploration volume of lateral layered waypoint generation and vertical undulating waypoint generation algorithms of the proposed method is about twice that of NBVP, FUEL, and FUEL.

The information data processing terminal provided in this disclosure is designed to achieve a high-efficient autonomous exploration system for UAVs. The terminal is a key component used to achieve intelligent command processing, task planning, dynamic adjustment, and real-time communication functions of UAVs. The implementation principle of this data processing terminal involves multiple core components and technologies, comprising hardware platform, software architecture, data communication protocol, and security mechanism. These components are elaborated as follows:

Hardware platform: The information data processing terminal typically includes one or more high-performance microprocessors or microcontrollers equipped with sufficient computing power to process complex algorithms and large amounts of sensor data. In addition, the terminal also includes memory, storage, various sensor interfaces, and communication interfaces (such as Wi Fi), Bluetooth, 4G/5G, etc. The hardware platform also needs to integrate GPS modules for the positioning and navigation of UAVs.

Software architecture: The software architecture of the terminal includes the operating system, middleware, and application layer. The operating system needs to support real-time data processing, such as ROS (Real-time Operating System). The middleware layer handles data caching, message queues, and hardware abstraction, simplifying the development of the application layer. The application layer implements specific functional algorithms, such as waypoint generation, path planning, obstacle avoidance processing, etc.

Data communication protocol: The terminal needs to exchange data with other systems (such as flight control systems) on the UAVs, ground control stations, and cloud platforms. This requires the terminal to support multiple data communication protocols, including but not limited to MavLink (for UAV communication), HTTP/HTTPS (for network communication), WebSocket (real-time data interaction), etc. These protocols ensure timely and accurate transmission of data.

Security mechanism: Information security is a crucial part of data processing terminals, which requires implementation functions such as data encryption, identity verification, and access control. Encryption technologies such as AES, RSA, etc, ensure the security of data during transmission and storage. Identity verification and access control ensure that only authorized users and systems can access terminal resources.

Real-time control and optimization: The terminal also needs to achieve real-time control of the UAVs. This includes collecting data from sensors, processing this data, and generating flight instructions. At the same time, using optimization algorithms (such as genetic algorithms, simulated annealing, etc.) to dynamically adjust flight paths to cope with real-time changes in the environment.

The information data processing terminal provides an efficient and secure autonomous exploration capability for UAVs by integrating advanced computing hardware, flexible software architecture, multi-protocol communication capabilities, and powerful security mechanisms. This type of terminal can process complex datasets from multiple sensors of UAVs, generate and adjust flight plans in real-time, and ensure the efficient, stable, and safe operation of the entire system.

The signal processing and connection relationships between various modules in the high-efficient autonomous exploration system of the UAVs in this disclosure and the data processing flow are explained. The following are the detailed signal and data processing steps of each component of the system:

Signal Processing and Connection Relationships of System Components:

1) Heuristic Waypoint Generation Module
Function: Defining exploration areas and waypoint intervals, and generate waypoints using algorithms.
Output: The generated waypoint data is transmitted to the global path planning module.

2) Global Path Planning Module
Input: Receiving waypoint data from the heuristic waypoint generation module.
Processing: Using the A* algorithm to generate global paths based on waypoints.
Output: The generated global path is transmitted to the local trajectory generation module and the real-time positioning and mapping module.

3) Real-Time Positioning and Mapping Module
Input: Receiving environmental data from LiDAR sensors.
Processing: Extracting features, performing motion estimation and data association, updating maps and UAV positioning.
Output: The updated UAV position and map data are fed back to the global path planning module and local real-time replanning module.

4) Local Trajectory Generation Module
Input: Receiving the global path of the global path planning module.
Processing: Using the B-spline parameterization method to generate smooth, collision-free, and dynamically feasible local planning trajectory.
Output: The generated local trajectory is transmitted to the real-time obstacle avoidance and dynamic feasibility constraint module and the local real-time replanning module.

5) Real-Time Obstacle Avoidance and Dynamic Feasibility Constraint Module
Input: Receiving the local trajectory generated by the local trajectory generation module.
Processing: Dynamically optimizing the local trajectory to ensure smoothness, collision-free, and dynamic feasibility.
Output: The optimized trajectory is fed back to the local real-time replanning module.

6) Local Real-Time Replanning Module
Input: Receiving data from the local trajectory generation module and the real-time obstacle avoidance and dynamic feasibility constraint module.
Processing: Detecting and avoiding obstacles, generating new local trajectory, and reintegrating the new trajectory into the global trajectory.

Output: The updated global and local trajectories are fed back to the flight control module.

7) Flight Control Module
Input: Receiving the updated trajectory of the local real-time replanning module.
Processing: Using UAV control algorithms for precise flight control of UAVs.
Output: Performing flight operations for UAVs.

Detailed Signal and Data Processing Process:
The waypoint generation module generates waypoints through defined exploration area parameters and intervals and sends waypoint data to the global path planning module.

The global path planning module receives waypoint data, applies the A* algorithm to generate the global path, and sends the path information to the local trajectory generation module and the real-time positioning and mapping module.

The real-time positioning and mapping module receives environmental data in real-time, updates the position and map of the UAVs, and provides feedback to the global path planning and local real-time replanning modules.

The local trajectory generation module generates refined local trajectory based on the global path and sends to the real-time obstacle avoidance module for optimization.

The real-time obstacle avoidance module optimizes local trajectory to ensure collision-free and dynamic feasibility and sends the optimization results to the local real-time replanning module.

The local real-time replanning module dynamically adjusts the trajectory based on the synthetically received data to ensure safe flight of the UAVs and sends the final trajectory to the flight control module.

The flight control module accurately controls the UAVs based on the received trajectory and executes flight tasks.

Through this systematic data processing and signal transmission process, the high-efficient autonomous exploration system of UAVs can effectively achieve autonomous flight tasks in complex environments.

The above is only the specific implementation method disclosed in this disclosure, but the scope of protection of this disclosure is not limited to this. Any technical personnel familiar with the technical field within the scope of the disclosed technology, and any modifications, equivalent replacements, and improvements made within the spirit and principles of this disclosure should be covered within the scope of protection of this disclosure.

What is claimed is:
1. A high-efficient autonomous exploration method for UAVs, wherein Using heuristic waypoint generation method, creating a complete global path based on waypoints, including waypoints in both lateral and vertical directions; subsequently, adopting nonlinear optimization to generate smooth, collision-free, and dynamically feasible local planning trajectories by B-spline curves; finally, when detecting obstacles, using sliding a window strategy to adjust the trajectories quickly; specifically include:
S1, heuristic waypoints generating: setting an exploration scope and a waypoint spacing, and generating waypoints by waypoint generation algorithms;
S2, global path planning: after generating heuristic waypoints, an A* algorithm is used to generate a global planning path;

S3, real-time positioning, and mapping: using point clouds for real-time positioning and mapping;

S4, local B-spline trajectories generating: using B-spline parameterization methods to generate local trajectories;

S5, real-time obstacle avoidance and dynamic feasibility constraining: optimizing the trajectories to achieve fast convergence, generating smooth, collision-free, and dynamically feasible trajectories;

S6, local real-time replanning: using time sliding windows for local replanning; and S7, flight controlling: using UAV control algorithms for controlling UAVs robustly; the step S1 specifically comprising:

(1) exploration scope setting: setting an exploration scope of a sample site according to actual requirements, including defining a length, a width and a height dimensions;

(2) waypoint spacing setting: generating 3D waypoints by traversing an entire exploration space, and setting step sizes in three directions respectively: length, width, and height; the step sizes in three directions are determined according to actual situation;

(3) waypoint generation algorithms: traversing and exploring entire unknown space by using different waypoint generation strategies in an exploration space: firstly, using an idea of lateral layering, first generating waypoints in a plane with a certain step size and completely traversing the entire space, and then generating waypoints in next plane based on a step size of altitude direction until the entire space is completely traversed; secondly, adopting an idea of vertical undulation, the generated waypoints are undulated intermittently, wherein a maximum and a minimum scope of interval undulations can be set to be consistent until the entire space is completely traversed;

thirdly, in order to obtain more complete data for a single tree, a series of waypoints are generated through an idea of spiral ascent.

2. The high-efficient autonomous exploration method for UAVs according to claim 1, wherein the step 2 specifically comprising:

(1) initializing:
1) Determining starting and target points as starting and ending nodes for the A* algorithm;
2) Creating an open list to store nodes to be expanded, and a closed list to store nodes have already been expanded;
3) Adding the starting node to the open list, setting an initial cost to 0, and calculating a heuristic estimate value;

(2) iterative looping: entering a loop until the open list is empty or a target node is found;

(3) iterative looping: selecting a node from the open list, the node should be provided with a lowest total cost (a cost+the heuristic estimate value), and the node will become a current expansion node;

(4) node expanding: expanding the current expansion node by finding adjacent feasible nodes, calculating the cost and the heuristic estimate value, and adding to the open list;

(5) checking adjacent nodes: performing following checks for each adjacent node:
1) If the node is already in the closed list, skipping and no longer considering;
2) If the node is not in the open list, adding to the open list and setting a parent node as a current extension node;

3) If the node is already in the open list, comparing a current path cost with existing path cost, selecting a smaller cost path, updating the parent node to the current expansion node;

(6) termination condition checking: if the target node appears in the open list, or if the open list is empty, terminating looping;

(7) refactoring path: if the path is found, starting from the target node and tracing back to the starting node through a parent node pointer to obtain a final path; and (8) returning result: returning the generated global path or indicating results of the path cannot be found.

3. The high-efficient autonomous exploration method for UAVs according to claim 1, wherein the step 3 specifically comprising:

(1) data acquiring: collecting environmental data through LiDAR sensors to obtain laser point cloud data; the point cloud data contains location information of objects in the environment;

(2) feature extracting: extracting features from the laser point cloud data, such as ground features, tree trunk features, etc; these features will be used for subsequent location and mapping processes;

(3) motion estimating: estimating robots' motion by comparing feature point changes between consecutive frames;

(4) data associating: associating features of current frame with previously established map features to identify the feature points in the known map matching with the current frame;

(5) map updating: based on results of data association, updating the map and adding new feature points to the map;

(6) location updating: based on results of motion estimation and data association, updating position estimation of the robots, the robots here specifically refer to the UAVS;

(7) looping detecting: detecting whether a loop has occurred, that is, whether the robots have returned to previously explored position during exploration process; looping detection can avoid accumulated errors; and (8) optimizing: optimizing the trajectories of the map and robots to reduce cumulative errors by using optimization methods.

4. The high-efficient autonomous exploration method for UAVs according to claim 1, wherein the step 4 specifically comprising:

using the B-spline parameterization method to generate the local trajectories, a B-spline of degree p is a piecewise polynomial function defined by a series of discrete control points $\{P_0, P_1, \ldots P_N\}$ and node vectors wherein $t_{m+1}-t_m$ is the same time interval $\Delta t_m$, and wherein $P_i \in R^3$, $t_m \in R$, and m=N+p+1, values of the B-spline can be represented by a matrix:

$$B(s) = \left[1, s, s^2, \ldots, s^P\right] \cdot M_{p+1} \cdot [P_{m-p}, P_{m-p+1}, P_{m-p+2}, \ldots, P_m]^T;$$

Here, Mp+1 is a constant matrix depends only on the parameter p, the p is 3, while $s=(t-t_m/(t_{m+1}-t_m)$, wherein t belongs to an interval $[t_m, t_{m+1})$.

5. The high-efficient autonomous exploration method for UAVs according to claim 1, wherein the step 5 specifically comprising:

the uniform B-spline has the same time interval $\Delta t$, and calculation formulas for velocity $V_i$ of control points $P_i$ acceleration $A_i$, and jerk $J_i$ are as follows:

$$V_i = \frac{P_{(+)} - P_i}{\Delta t}, A_i = \frac{V_{i+t} - V_i}{\Delta t}, J_i = \frac{A_{i+1} - A_i}{\Delta t};$$

based on convex hull characteristic of B-splines, optimizing the trajectories to achieve fast convergence, generating smooth, collision-free, and dynamically feasible trajectories.

6. The high-efficient autonomous exploration method for UAVs according to claim 1, wherein the step 6 specifically comprising:

using the time sliding windows for local replanning, a trajectory replanning mechanism will be triggered when the sliding window detects the local trajectory passing through obstacles; then a new local trajectory is generated to avoid obstacles and ensure safety of the UAVS, and a new local trajectory is re-integrated into the global trajectory.

7. A system for implementing the high-efficient autonomous exploration method for UAVs according to claim 1, wherein comprising:

heuristic waypoint generation module: setting the exploration scope and the waypoint spacing, and generating waypoints through waypoint generation algorithms;

global path planning module: after generating heuristic waypoints, the A* algorithm is used to generate the global planning path;

real-time positioning and mapping module: using point clouds for real-time positioning and mapping;

local B-spline trajectory generation module: using the B-spline parameterization method to generate local trajectories;

real-time obstacle avoidance and dynamic feasibility constraint module: optimizing trajectories to achieve fast convergence, generate smooth, collision-free, and dynamically feasible trajectories;

local real-time replanning module: using the time sliding windows for local replanning; and flight controlling module: using UAV control algorithms for controlling UAVs robustly.

8. An information data processing terminal, wherein the information data processing terminal is used for implementing a high-efficient autonomous exploration system for the UAVs as claimed in claim 7.

9. The high-efficiency autonomous exploration system for UAVs according to claim 1, wherein:

the local real-time replanning module, which is used to receive the global planning paths, the mapping results, and the optimized trajectories, performing real-time replanning of the local trajectories, generating safe flight trajectories;

local real-time replanning module, which is used to send replanning trajectories to the flight control module; and the flight control module, which is used to control the UAVs in real-time by UAV control algorithms based on received replanning trajectory, ensuring safe flight of the UAVs according to optimized trajectories.

10. A high-efficiency autonomous exploration system for UAVs, wherein the system comprising:

one or more processors caused to perform a method, the method includes:

a heuristic waypoint generation module, which is used to receive instructions for setting the exploration scope and waypoint spacing, generating waypoint data through the waypoint generation algorithm, and sending generated waypoint data to the global path planning module;

a global path planning module, which is used to receive waypoint data, uses the A* algorithm for path planning, generating the global planning path, and sending the global planning path to the real-time positioning and mapping module and local real-time replanning module;

a real-time positioning and mapping module, which is used to receive global planning paths, collecting environmental data and extracting features, performing real-time positioning and mapping, and sending mapping results to a local trajectory generation module;

a local real-time replanning module; and the local trajectory generation module, which is used to receive the global planning path and mapping results, using the B-spline parameterization method to generate the local planning trajectories, and send the local planning trajectories to the real-time obstacle avoidance and dynamic feasibility constraint module;

a real-time obstacle avoidance and dynamic feasibility constraint module, which is used to receive local planning trajectories, optimizing the trajectories to achieve fast convergence, ensuring smoothness, collision-free, and dynamic feasibility of trajectories, and sending optimized trajectories to the local real-time replanning module;

the local real-time replanning module, which is used to receive the global planning paths, mapping results, and optimized trajectories; the time sliding window strategy is used for real-time replanning of local trajectories to ensure safe flight of UAVs; and a flight control module, which is used to receive optimized trajectories and use UAV control algorithms to perform control on the UAVs robustly, achieving high-efficient autonomous exploration.

11. The high-efficiency autonomous exploration system for UAVs according to claim 10, wherein a signal processing flow between the global path planning module and the real-time positioning and mapping module further comprising:

the global path planning module, which is used to send a generated global planning path to the real-time positioning and mapping module;

the real-time positioning and mapping module, which is used for real-time positioning and mapping to generate mapping results based on received global planning path, combined with environmental data and feature extraction results; and the real-time positioning and mapping module, which is used to send the mapping results back to the global path planning module, so the global path planning module can adjust and optimize the path in real time-based on latest mapping results.

12. The high-efficiency autonomous exploration system for UAVs according to claim 10, wherein the local trajectory generation module, which is used to send generated local planning trajectories to the real-time obstacle avoidance and dynamic feasibility constraint module;

the real-time obstacle avoidance and dynamic feasibility constraint module, which is used to perform real-time obstacle avoidance processing and dynamic feasibility constraint optimization on received local planning trajectories, ensuring smoothness, collision-free, and dynamic feasibility of the trajectories; and the real-time obstacle avoidance and dynamic feasibility constraint module is used to send the optimized trajectories back to the local trajectory generation module so that the local trajectory generation module can further adjust and optimize the trajectories based on the optimized trajectories.

\* \* \* \* \*